United States Patent [19]

Otsuka et al.

[11] Patent Number: 4,503,479
[45] Date of Patent: Mar. 5, 1985

[54] ELECTRONIC CIRCUIT FOR VEHICLES, HAVING A FAIL SAFE FUNCTION FOR ABNORMALITY IN SUPPLY VOLTAGE

[75] Inventors: Kazuo Otsuka, Higashikurume; Shin Narasaka, Yono; Shumpei Hasegawa, Niiza, all of Japan

[73] Assignee: Honda Motor Co., Ltd., Tokyo, Japan

[21] Appl. No.: 528,236

[22] Filed: Aug. 31, 1983

Related U.S. Application Data

[63] Continuation of Ser. No. 297,998, Aug. 31, 1981, abandoned.

[30] Foreign Application Priority Data

Sep. 4, 1980 [JP] Japan ................. 55-122594

[51] Int. Cl.³ .................. H02H 3/20; H02H 3/24
[52] U.S. Cl. ................... 361/90; 123/480; 340/661; 364/431.11
[58] Field of Search ............ 361/90, 18; 340/660–663; 323/276; 320/48; 123/479, 480; 364/431.11, 431.05, 431.06

[56] References Cited

U.S. PATENT DOCUMENTS

| | | | |
|---|---|---|---|
| 3,506,967 | 4/1970 | Foley | 361/90 X |
| 3,663,958 | 5/1972 | Crane | 361/90 X |
| 4,054,830 | 10/1977 | Harrel | 361/18 X |
| 4,244,050 | 1/1981 | Weber et al. | 364/431.11 X |
| 4,245,150 | 1/1981 | Driscoll et al. | 361/92 X |
| 4,306,270 | 12/1981 | Miller et al. | 361/90 X |
| 4,327,397 | 4/1982 | McCleery | 361/90 |
| 4,348,727 | 9/1982 | Kobayashi et al. | 123/480 X |

OTHER PUBLICATIONS

18414, Res. Disclosure, Great Britain, No. 184, Aug. 1979.
Electronic Design; "Simple Circuit Checks Power-Supply Faults"; Lindberg, pp. 57–63, Aug. 2, 1980.

Primary Examiner—Reinhard J. Eisenzopf
Attorney, Agent, or Firm—Arthur L. Lessler

[57] ABSTRACT

An electronic circuit for use in a vehicle equipped with an internal combustion engine. The electronic circuit comprises a constant-voltage regulated power-supply circuit, a control circuit having a central processing unit for controlling electrical apparatus installed in the vehicle, and a detecting circuit for detecting variations in supply voltage supplied from the power-supply circuit. The detecting circuit is adapted to generate an output signal when the supply voltage of the power-supply circuit is out of a predetermined range. The electronic circuit further includes circuitry responsive to the output signal of the detecting circuit to render the central processing unit inoperative and an alarm responsive to the same output signal to give warnings.

5 Claims, 3 Drawing Figures

ELECTRONIC CIRCUIT FOR VEHICLES, HAVING A FAIL SAFE FUNCTION FOR ABNORMALITY IN SUPPLY VOLTAGE

This application is a continuation of application Ser. No. 297,998, filed Aug. 31, 1981 and now abandoned.

BACKGROUND OF THE INVENTION

This invention relates to an electronic circuit for controlling various electrical apparatus installed in a vehicle equipped with an internal combustion engine, and more particularly to an electronic circuit of this kind which is provided with a fail safe function which is executed in the event of the occurrence of abnormality in the supply voltage.

Conventionally, there have been proposed a variety of control systems for controlling internal combustion engines for vehicles, such as air/fuel ratio control systems, fuel injection systems, automatic transmission systems, and exhaust emission control systems.

These control systems are each provided with an electronic control circuit, such as an electronic control unit (ECU), which includes a central processing unit (CPU). The electronic control circuit is arranged to control electrical apparatus which are installed in a vehicle for performing their respective intended operations, in response to operating condition of an engine installed in the vehicle.

For instance, according to an air/fuel ratio control system, which has been proposed by the assignee of the present application, an air/fuel ratio control valve is arranged in connection with fuel quantity adjusting means such as a carburetor, for controlling the quantity of air or fuel to be present in an air/fuel mixture being supplied to an internal combustion engine. An electronic control unit (ECU) is used to drive the air/fuel ratio control valve by means of an actuator such as a pulse motor which forms one of the above-mentioned electrical apparatus, to perform feedback control of the air/fuel ratio of the mixture to a predetermined value in response to an output signal produced by a sensor for detecting the concentration of an exhaust gas ingredient emitted from the engine.

Electronic control circuits used in or with various control systems inclusive of the above air/fuel ratio control system are usually formed of microcomputers. However, microcomputers in general are apt to have their operations affected by variations in the supply voltage. To cope with this, a microcomputer is connected to a voltage regulated power-supply circuit for supplying the same with a regulated supply voltage, to ensure normal operation of the component devices of the microcomputer so that the microcomputer can properly perform its required control operation.

Even with the above voltage regulated power-supply circuit, the possibility still exists that the supply voltage of the power-supply circuit becomes out of a predetermined tolerable range at the low-temperature start of the engine or in the event of a failure in the power-supply circuit per se or a break in the related wiring. On such occasion, the component devices of the electronic control circuit do not normally operate. If the control operation is then continued without taking any emergency measures, there can occur abnormality in the control operation, which can result in various disadvantages such as inferior driveability of the vehicle and increased amounts of exhaust gas ingredients emitted from the engine.

OBJECTS AND SUMMARY OF THE INVENTION

It is an object of the invention to provide an electronic circuit for use in a vehicle, which is provided with a fail safe function for abnormality in the supply voltage, which comprises detecting deviation of the supply voltage of the power-supply circuit from a predetermined voltage range within which the component devices can operate properly, and immediately rendering the central processing unit of the electronic circuit inoperative, and if necessary, performing an alarm action. The electronic circuit having the above function according to the invention, if applied to an air/fuel ratio control system, can eliminate the possibility that the air/fuel ratio is controlled to an abnormal value due to malfunction of the central processing unit.

It is a further object of the invention to provide an electronic circuit for use in a vehicle, which is constructed such that the central processing unit automatically resumes its normal operation upon the supply voltage returning to its normal value after the central processing unit has been rendered inoperative due to abnormality in the supply voltage. Thus, abnormality in the supply voltage can be positively detected with no influence of mere power source noise or other disturbances, to thereby allow continuation of the operation of a control system associated with the electronic circuit even with the occurrence of such disturbances.

According to the invention, there is provided an electronic circuit for use in a vehicle which is equipped with an internal combustion engine and a power source, the electronic circuit comprising: a power-supply circuit for controlling a voltage supplied from the power source to a predetermined voltage; at least one electrical apparatus installed in the vehicle; a control circuit arranged to be supplied with power from the power-supply circuit and having a central processing unit for controlling the operation of the electrical apparatus; a detecting circuit arranged to detect voltage variations in the power supplied from the power-supply circuit and produce an output signal when the power has a voltage lying out of a predetermined range; and means responsive to the output signal of the detecting circuit to render the central processing unit inoperative. The electronic circuit may further include means responsive to the output of the detecting circuit to perform an alarming action.

The above and other objects, features and advantages of the invention will be more apparent from the ensuing detailed description taken in connection with the accompanying drawings in which:

DETAILED DESCRIPTION

Details of the invention will now be described with reference to the drawings which illustrate an embodiment of the invention.

Figure 1:
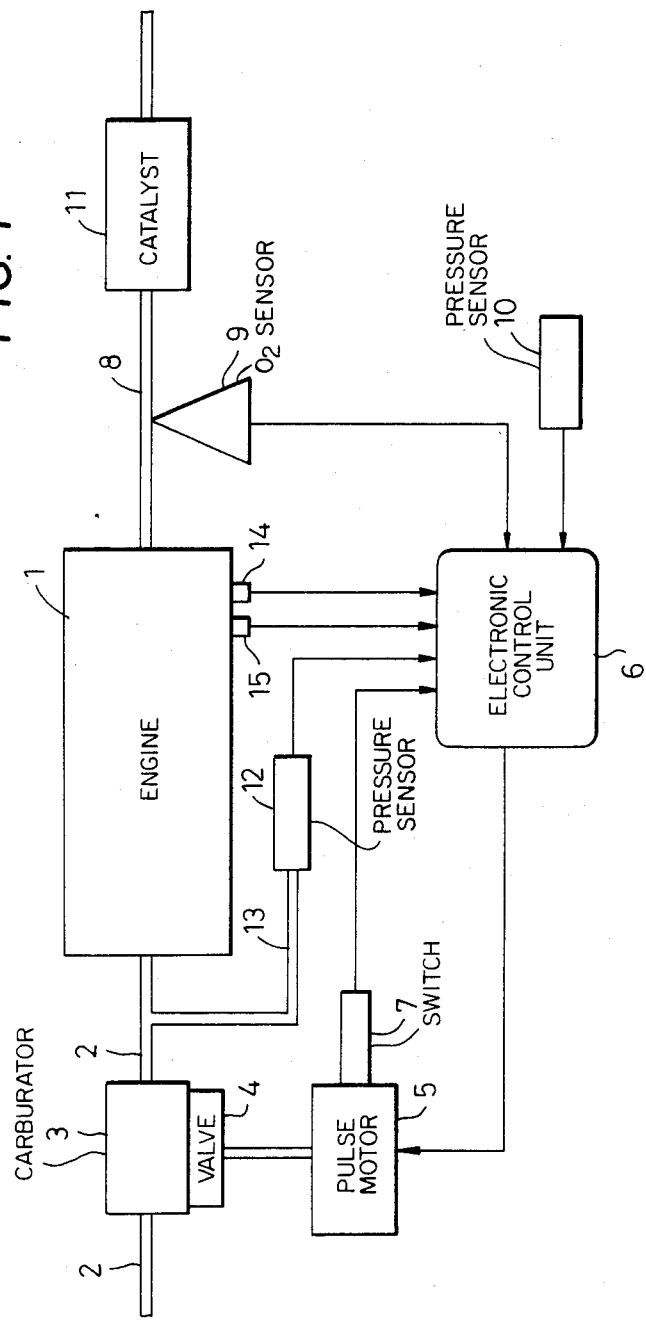
FIG. 1 is a block diagram illustrating the whole arrangement of an air/fuel ratio control system for internal combustion engines, to which is applicable the electronic circuit according to the invention.

Referring first to FIG. 1, there is shown a block diagram illustrating the whole arrangement of an air/fuel ratio control system which is provided with an electronic circuit according to one embodiment of the invention.

Reference numeral 1 designates an internal combustion engine. Connected to the engine 1 is an intake manifold 2 which is provided with a carburetor generally designated by the numeral 3. The carburetor 3 has main and slow speed fuel passages, not shown, which communicate the float chamber, not shown, of the carburetor 3 with primary and secondary bores, not shown. These fuel passages communicate with the atmosphere by means of air bleed passages, not shown.

At least one of these fuel passages or air bleed passages is connected to an air/fuel ratio control valve 4. The air/fuel ratio control valve 4 is comprised of a required number of flow rate control valves, not shown, each of which is arranged to be driven by a pulse motor 5 so as to vary the opening of the at least one of the above passages. The pulse motor 5 is electrically connected to an electronic control unit (hereinafter called "ECU") 6 to be rotated by driving pulses supplied therefrom so that the flow rate control valves are displaced to vary the flow rate of air or fuel being supplied to the engine 1 through the at least one passage. Although the air/fuel ratio can be controlled by thus varying the flow rate of air or fuel being supplied to the engine 1, a preferable concrete measure should be such as varies the opening of at least one of the aforementioned air bleed passages to control the flow rate of bleed air.

The pulse motor 5 is provided with a reed switch 7 which is arranged to turn on or off depending upon the moving direction of the valve body of the air/fuel ratio control valve 4 each time the same valve body passes a reference position, to supply a corresponding binary signal to ECU 6.

On the other hand, an $O_2$ sensor 9, which is formed of stabilized zirconium oxide or the like, is mounted in the peripheral wall of an exhaust manifold 8 leading from the engine 1 in a manner projected into the manifold 8. The sensor 9 is electrically connected to ECU 6 to supply its output signal thereto. An atmospheric pressure sensor 10 is arranged to detect the ambient atmospheric pressure surrounding the vehicle, not shown, in which the engine 1 is installed, the sensor 10 being electrically connected to ECU 6 to supply its output signal thereto, too.

Incidentally, in FIG. 1, reference numeral 11 designates a three-way catalyst, 12 a pressure sensor arranged to detect absolute pressure in the intake manifold 2 through a conduit 13 and electrically connected to ECU 6 to supply its output signal thereto, and 14 a thermistor arranged to detect the temperature of engine cooling water and also electrically connected to ECU 6 to supply its output signal thereto. Reference numeral 15 generally designates an engine rpm sensor which is comprised of a distributor and an ignition coil and arranged to supply pulses generated in the ignition coil to ECU 6.

Details of the air/fuel ratio control which can be performed by the air/fuel ratio control system outlined above will now be described.

At the start of the engine, ECU 6 once moves the pulse motor to its reference position and then moves it to a predetermined position best suitable for the startability of the engine 1 (a preset position) (hereinafter called "$PS_{CR}$"), thus setting the air/fuel ratio to a predetermined proper value.

Then, ECU 6 monitors the condition of activation of the $O_2$ sensor 9 and the engine coolant temperature Tw detected by the thermistor 14 and judges that the condition of initiation of the air/fuel ratio has been fulfilled when the $O_2$ sensor 9 is fully activated and the engine is in a warmed-up state.

During the above stage of detection of activation of the $O_2$ sensor and the coolant temperature Tw, the pulse motor 5 is held at the aforementioned predetermined position $PS_{CR}$. From this position, it is driven to appropriate positions in response to the operating condition of the engine after initiation of the air/fuel ratio control hereinlater described.

Following the initialization, the program in ECU 6 proceeds to the basic air/fuel ratio control.

ECU 6 is responsive to various detected value signals representing the output voltage V of the $O_2$ sensor 9, the absolute pressure $P_B$ in the intake manifold 2 detected by the pressure sensor 12, the engine rpm Ne detected by the rpm sensor 15, and the atmospheric pressure $P_A$ detected by the atmospheric pressure sensor 10, to drive the pulse motor 5 as a function of these signals to control the air/fuel ratio. More specifically, the basic air/fuel ratio control comprises open loop control which is carried out at wide-open-throttle, at engine idle, at engine deceleration, and at engine acceleration at the standing start of the engine, and closed loop control which is carried out at engine partial load. All the control is initiated after completion of the warming-up of the engine.

To obtain optimum exhaust emission characteristics irrespective of changes in the actual atmospheric pressure during open loop air/fuel ratio control or at the time of shifting from open loop mode to closed loop mode, the position of the pulse motor 5 needs to be compensated for atmospheric pressure during open loop control.

During the closed loop control, ECU 6 performs selectively feedback control based upon proportional term correction (hereinafter called "P term control") and feedback control based upon integral term correction (hereinafter called "I term control"), in response to the engine rpm Ne detected by the engine rpm sensor 15, and the output signal V of the $O_2$ sensor 9. To be concrete, the integral term correction is used when the output voltage V of the $O_2$ sensor 9 varies only at the higher level side or only at the lower level side with respect to a reference voltage Vref, wherein the position of the pulse motor 5 is corrected by an integral value obtained by integrating the value of a binary signal which changes in dependence on whether the output voltage V of the $O_2$ sensor is at the higher level or at the lower level with respect to the predetermined reference voltage Vref (I term control). On the other hand, when the output signal V of the $O_2$ sensor changes from the higher level to the lower level or vice versa, the proportional term correction is carried out wherein the position of the pulse motor 5 is corrected by a value directly proportional to a change in the output voltage of the O₂ sensor (P term control).

According to the above I term control, the number of steps by which the pulse motor is to be displaced per second increases with an increase in the engine rpm so that it becomes larger in a higher engine rpm range. Whilst, according to the P term control, the number of steps by which the pulse motor is to be displaced is set at a single predetermined value (e.g., 6 steps), irrespective of the engine rpm.

Figure 2:
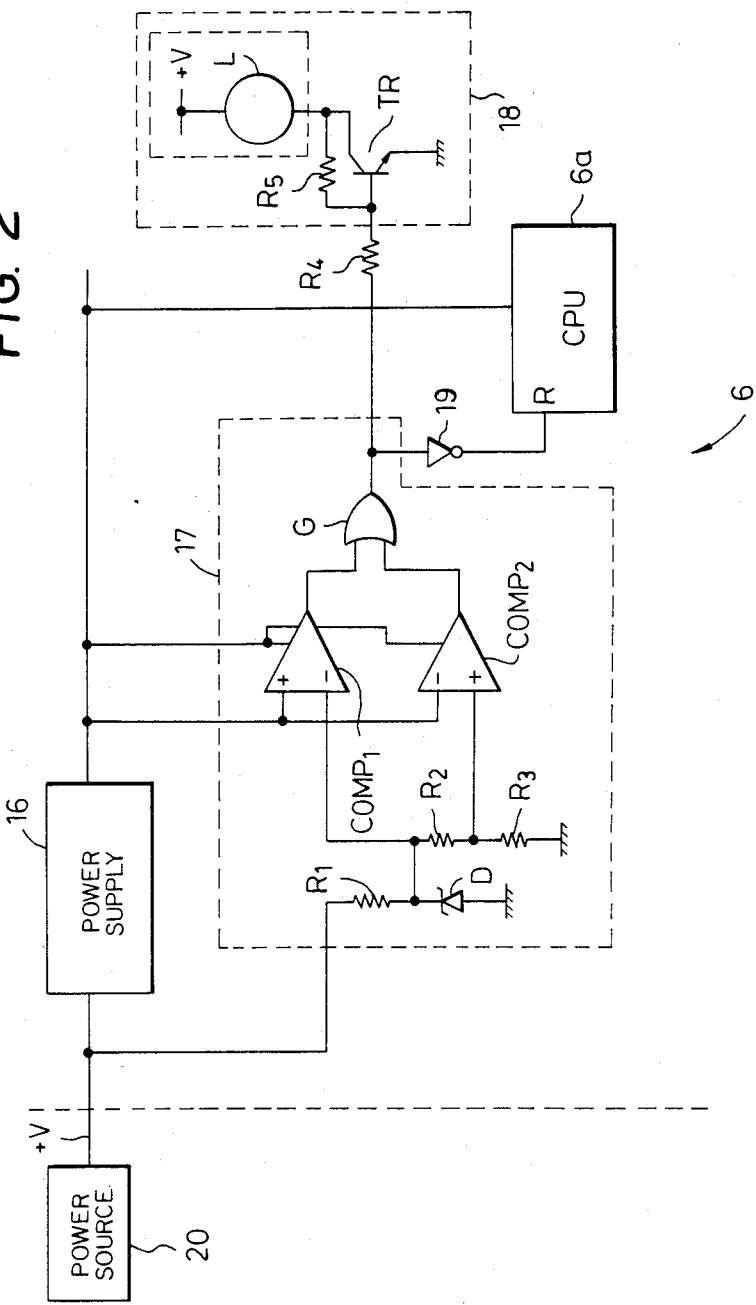
FIG. 2 is a circuit diagram illustrating one embodiment of the electronic circuit according to the invention which is provided with a fail safe function for abnormality in the supply voltage supplied to the electronic control unit (ECU) in FIG. 1.

Referring next to FIG. 2, there is illustrated a circuit diagram of the arrangement of a fail safe device for counteracting abnormality in the supply voltage supplied to an electronic circuit which forms part of ECU 6 provided in the air/fuel ratio control system described above.

Reference numeral 16 designates a constant voltage-regulated power-supply circuit which has its input connected to a power source 20 which may be formed of a battery installed in the vehicle, and its output to the supply voltage input terminals of various component circuits in ECU 6, inclusive of a central processing unit 6a appearing in FIG. 2. This constant voltage-regulated power-supply circuit 16 is adapted to regulate a supply voltage (e.g., 12 volts) outputted from the above power source 20 to a constant voltage equal to the voltage (e.g., 5 volts) required by ECU 6. This power-supply circuit 16 is also connected to a voltage variation detecting circuit 17. More specifically, this detecting circuit 17 includes a first comparator COMP₁ and a second comparator COMP₂. The constant voltage-regulated power-supply circuit 16 has its output connected directly to the non-inverting input terminal of the first comparator COMP₁ and the inverting input terminal of the second comparator COMP₂. A Zener diode D for setting an upper limit voltage has its one end grounded and its other end connected to the output of the 12-volt power source 20 by way of a resistance R₁. The junction of the Zener diode D with the resistance R₁ is connected to the inverting input terminal of the first comparator COMP₁ to supply it with an upper limit voltage (e.g., 5.25 volts). Serially connected between the junction of the Zener diode D with the resistance R₁ and the ground are lower limit voltage setting resistances R₂, R₃, the junction between which is connected to the noninverting input terminal of the second comparator COMP₂ to supply it with a lower limit voltage (e.g., 4.75 volts). The first and second comparators COMP₁, COMP₂ have their outputs connected to the input of a gate circuit G which is formed of an OR circuit, which in turn has its output connected to the base of an NPN transistor for control of an alarm lamp L forming part of an alarm device 18, by way of a current limiting resistance R₄. This transistor TR has its collector connected to one end of the lamp L which has its other end connected to a suitable positive voltage power source, not shown, and its emitter grounded. Incidentally, a protective resistance R₅ is connected between the base of the transistor TR and the collector of the same.

The gate circuit G has its output connected to the reset signal input terminal R of the central processing unit (CPU) 6a provided within ECU 6, by way of an inverter 19. The central processing unit 6a is adapted to be reset when supplied at its reset signal input terminal R with a reset signal of 0.

Figure 3:
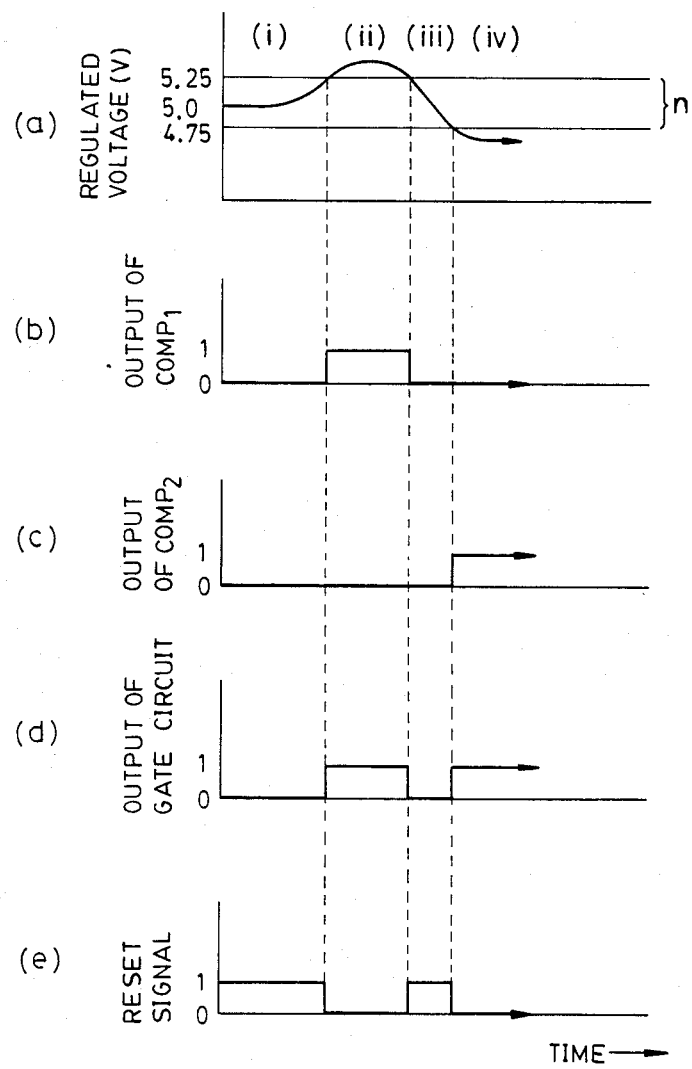
FIG. 3 is a graph showing the operation of the electronic circuit in FIG. 2.

The operation of the arrangement of FIG. 2 will now be described by reference to FIGS. 2 and 3. During normal operation, the constant voltage-regulated power-supply circuit 16 supplies a regulated voltage of 5 volts for instance to the component circuits of ECU 6 inclusive of the central processing unit 6a (FIG. 3(a)-(i)). The voltages applied to the non-inverting input terminals of the upper limit value comparing first comparator COMP₁ and the lower limit value comparing second comparator COMP₂ are both lower than those applied to the respective inverting input terminals of the same comparators, so that the comparators COMP₁, COMP₂ both produce binary outputs of 0. Accordingly, the gate circuit G produces a binary output of 0, too, so that the inverter 19 supplies a reset signal of 1 to the central processing unit 6a of ECU 6, allowing the same to operate normally without being reset (FIG. 3(e)-(i)). Now, when the regulated voltage (normally 5 volts) outputted from the power-supply circuit 16 exceeds the upper limit value 5.25 volts delimiting the upper limit of the supply voltage range n within which ECU 6 can operate properly (FIG. 3(a)-(ii)), which can be caused by fluctuations in the output voltage (12 volts) of the nonregulated power source 20, abnormality in the regulated voltage power-supply circuit 16, etc., the voltage applied to the non-inverting input terminal of the upper limit comparing first comparator COMP₁ exceeds the upper limit voltage of 5.25 volts so that the comparator COMP₁ generates a binary output of 1 (FIG. 3(b)-(ii)) and accordingly the gate circuit G generates a corresponding binary output of 1 (FIG. 3(d)-(ii)). As a consequence, the transistor TR turns on to light the alarm lamp L and simultaneously the inverter 19 applies a reset signal of 0 to the central processing unit 6a of ECU 6 (FIG. 3(e)-(ii)) to reset the same, thus avoiding malfunction of ECU 6 which would otherwise be caused by the abnormality in the supply voltage. Then, when the regulated supply voltage returns to a value within the normal operating range n (FIG. 3(a)-(iii)), the outputs of the comparators COMP₁, COMP₂ both become 0 (FIG. 3(b), (c)-(iii)) so that the gate circuit G generates a binary output of 0 (FIG. 3(d)-(iii)) to cause putting-out of the alarm lamp L and simultaneously a reset signal of 1 is applied to the central processing unit 6a (FIG. 3(e)-(iii)) to cause the same to resume its normal operation. Subsequently, when the regulated voltage drops below the lower limit value of 4.75 volts of the normal operating range n due to fluctuations in the non-regulated power supply voltage, abnormality in the regulated voltage power-supply circuit 16, a short in a load circuit such as ECU 6 (FIG. 3(a)-(iv)), etc., the second comparator COMP₂ generates an output of 1 so that the gate circuit G generates a corresponding output of 1 (FIG. 3(d)-(iv)) to cause the alarm lamp L to be lit and also cause the inverter 19 to output a reset signal of 0 (FIG. 3(e)-(iv)) to reset the central precessing unit 6a.

What is claimed is:

1. An electronic circuit for use in a vehicle which is equipped with an internal combustion engine and an electrical power source, said electronic circuit consisting essentially of:
   a power-supply circuit for controlling a voltage supplied from said power source to a predetermined voltage;
   at least one electrical apparatus installed in said vehicle, said electrical apparatus being capable of changing the amount of air or fuel to be supplied to said engine;
   a control circuit arranged to be supplied with power from said power-supply circuit and having a central processing unit for controlling the operation of said at least one electrical apparatus, said central processing unit being susceptible to erratic operation when said voltage supplied thereto by said power-supply circuit is outside a predetermined range defined by a predetermined upper limit voltage and a predetermined lower limit voltage, said central processing unit being resettable;

a detecting circuit consisting essentially of a first comparator for comparing the voltage of said power supplied from said power-supply circuit with said predetermined upper limit voltage and a second comparator for comparing the voltage of said power supplied from said power-supply circuit with said predetermined lower limit voltage, said detecting circuit being adapted to produce an output signal immediately when said power has a voltage lying out of said predetermined range determined by said upper and lower limit voltages, and to stop producing said output signal immediately when the voltage of said power supplied from said power-supply circuit is restored to a value within said predetermined range, said first comparator having an inverting input terminal and a non-inverting input terminal, the non-inverting input terminal of said first comparator being connected substantially directly to the output of said power-supply circuit, said second comparator having an inverting input terminal and a non-inverting input terminal, the inverting input terminal of said second comparator being connected substantially directly to the output of said power-supply circuit, means for applying a first predetermined voltage delimiting an upper limit of said predetermined power-supply circuit voltage range to the inverting input terminal of said first comparator, means for applying a second predetermined voltage delimiting a lower limit of said predetermined power-supply circuit voltage range to the non-inverting input terminal of said second comparator, and an OR circuit having first and second input terminals substantially directly connected to outputs of said first and second comparators respectively; and means immediately responsive to said output signal of said detecting circuit to reset said central processing unit and to keep said central processing unit reset so long as said output signal is present, whereby said central processing unit remains connected to said power-supply circuit but is temporarily and immediately rendered inoperative at those times when the voltage applied thereto from said power-supply circuit is outside said predetermined range.

2. The electronic circuit as claimed in claim 1, further comprising means responsive to said output signal of said detecting circuit to perform an alarming action.

3. The electronic circuit as claimed in claim 1, wherein said electrical apparatus comprises an actuator controlled by said control circuit.

4. The electronic circuit as claimed in claim 3, wherein said engine is equipped with an air/fuel ratio control system including a control valve and said actuator is arranged to control said control valve.

5. The electronic circuit as claimed in claim 4, wherein said actuator comprises a pulse motor for controlling said control valve.

* * * * *